United States Patent
Carne

[11] Patent Number: 6,158,881
[45] Date of Patent: Dec. 12, 2000

[54] SEAT POST

[76] Inventor: Steven Andrew Carne, 23 The Warren, Bradley Barton, Newton Abbot, Devon, TQ12 1PP, United Kingdom

[21] Appl. No.: 09/268,470

[22] Filed: Mar. 16, 1999

[30] Foreign Application Priority Data

Dec. 19, 1998 [GB] United Kingdom ................ 98 27 935

[51] Int. Cl.[7] ...................................................... B62J 6/00
[52] U.S. Cl. ......................... 362/473; 362/183; 362/234; 362/184
[58] Field of Search ..................................... 362/183, 184, 362/394, 395, 473, 234; 340/432

[56] References Cited

U.S. PATENT DOCUMENTS

| | | | |
|---|---|---|---|
| 2,944,833 | 7/1960 | Wintermantel et al. | 362/473 |
| 4,204,191 | 5/1980 | Daniels | 362/473 |
| 4,325,108 | 4/1982 | Spingler | 362/183 |
| 4,814,951 | 3/1989 | Larsen | 362/473 |
| 4,819,135 | 4/1989 | Padilla et al. | 362/473 |
| 4,833,777 | 5/1989 | Clark | 362/473 |
| 4,860,177 | 8/1989 | Simms | 362/473 |
| 4,901,209 | 2/1990 | Nitz | 362/473 |
| 5,072,339 | 12/1991 | Shimojo | 362/473 |

*Primary Examiner*—Alan Cariaso
*Attorney, Agent, or Firm*—Ira S. Dorman

[57] ABSTRACT

The seat post includes a hollow support tube 1 which is partly inserted into a cycle frame 24 and carries a bracket 2 for supporting a seat. A series of light-emitting diodes 12 mounted on a printed circuit board 8 emit light through windows 13 in the support member. The circuit board also carries a flush-mounted or recessed on/off switch 9 which is accessible to control the supply of power to the diodes 12. Power may be supplied by one or more cells 16 inserted in the support member via a removable bottom end cap 21. The support member can also contain rechargeable cells which can be recharged via a power connector 32 at the bottom end of the support member.

8 Claims, 2 Drawing Sheets

SEAT POST

TECHNICAL FIELD OF THE INVENTION

This invention relates to seat posts for bicycles, tandems, tricycles etc. which, for convenience, with be collectively referred to below as "cycles".

BACKGROUND

Known seat posts comprise an elongate support member having a bracket mounted at the upper end for attachment to a seat. The post is inserted into an upstanding part of the cycle frame and secured by a clamp and screw arrangement. The height of the seat is adjusted by adjusting the proportion of the seat post which projects from the frame.

Existing seat posts are available in a range of prices, sometimes costing over £ 100. It is not uncommon for people to remove the seat and post when the cycle is left unattended so as to prevent the seat post from being stolen and also, because a cycle is not easily ridable without a seat, to reduce the risk of the cycle itself being stolen.

Cycles are also commonly provided with lights which are intended to make the rider more visible at night. Such lights are generally fitted as self-contained accessories incorporating replaceable or rechargeable batteries, and lights intended for competitive cycling are often designed to minimise wind resistance and drag. Again, a good quality light can cost a substantial amount of money and there is an ever-present risk of theft when the cycle is left unattended.

The present invention seeks to provide a new and inventive form of seat post.

SUMMARY OF THE INVENTION

The present invention proposes a seat post which includes a hollow elongate support member containing at least one light-emitting element arranged to emit light through a window in the support member.

The support member preferably includes a flush-mounted or recessed on/off switch controlling the supply of power to the light-emitting element or elements. Power may be supplied by one or more cells inserted in the support member, preferably via a removable bottom end cap. The support member can also contain rechargeable cells which can be recharged via a power connector at the bottom end of the support member.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
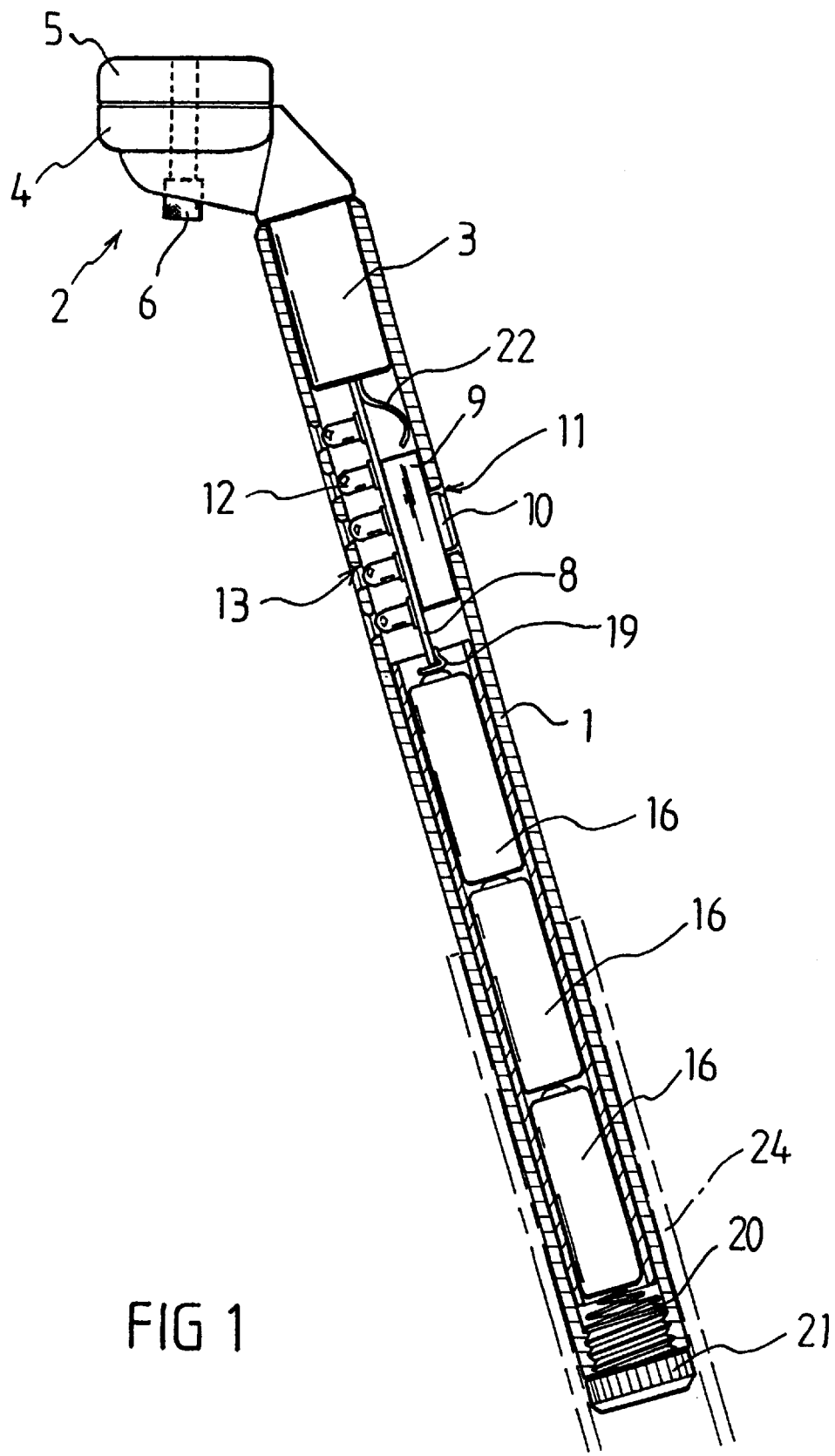
FIG. 1 is a longitudinal section through a seat post in accordance with the invention.

Referring to FIG. 1, the seat post includes a metal support tube 1, which will usually be cylindrical but may equally be square or of any other cross-section. In use, the tube 1 is generally inclined rearwardly in an upward direction as shown. At the top end of the seat post there is a seat bracket 2 which again may be of any suitable kind. In the present example the bracket 2 comprises a spigot 3 which is fixed in the top end of the support tube 1 and formed with an integral bottom clamp plate 4 disposed generally horizontal in use. The seat is clamped to the bracket by an upper clamp plate 5 using a screw 6 which is inserted through the bottom plate and screw-threaded into the top plate.

A printed circuit board 8 is slid into the tube 1 to locate against the spigot 3. On the front surface of the board 8 is mounted an on/off switch 9 which can be operated by a push-button 10 located in an aperture 11 in the front of the tube 1. The button is either flush with the outer surface of the tube as shown or slightly recessed. On the rear of the circuit board there is at least one light-emitting diode 12 (in this instance there are five) which have their lens surfaces aligned with holes 13 in the rear of the tube 1. The diodes are most conveniently aligned axially of the tube 1. The holes 13 preferably diverge outwardly as shown to increase visibility over a wider angle, and they may also be fitted with transparent covers (not shown) to prevent entry of water. Since the convention is for rearwardly directed lights to be red, the covers may be red and the diodes clear, or alternatively the diodes may emit red light through clear covers. The circuit board also carries conventional electronics allowing the diodes to flash on and off or be illuminated continuously.

Below the circuit board are inserted one or more electric cells (batteries) 16, in this case three, arranged in series. Lateral movement of the cells within the tube 1 may be prevented by a plastics sleeve 17. The cells may be arranged to supply power to the circuit board 8 by any suitable means such as electrically conductive strips or wires within the tube 1. In the present case however the positive end of the cells makes contact with a spring contact 19 mounted on the lower end of the circuit board 8. The negative terminal of the cells is contacted by an electrically conductive coil spring 20 which is held by a plastic battery-retaining cap 21 screw-threaded into the bottom of the tube 1. The spring 20 contacts the wall of the tube 1 which carries power to the circuit board 8 via a further spring contact 22, also mounted on the rear of the circuit board.

The tube 1 is inserted into a bicycle frame 24 and secured by conventional means, e.g. a quick-release lever. When the diodes are illuminated by depressing the button 10 they are clearly visible to the rear of the bicycle. It should be noted that generally they will be located above the level of any rear bag which is mounted on the frame. For security purposes, when the bicycle is left unattended the seat post can be slid down into the frame until the holes 13 and the button 10 are within the frame, or alternatively the entire seat and post can be removed. A set of cells will generally last for at least 100 hours, but replacement of the cells can easily be achieved by removal of the cap 21.

Figure 2:
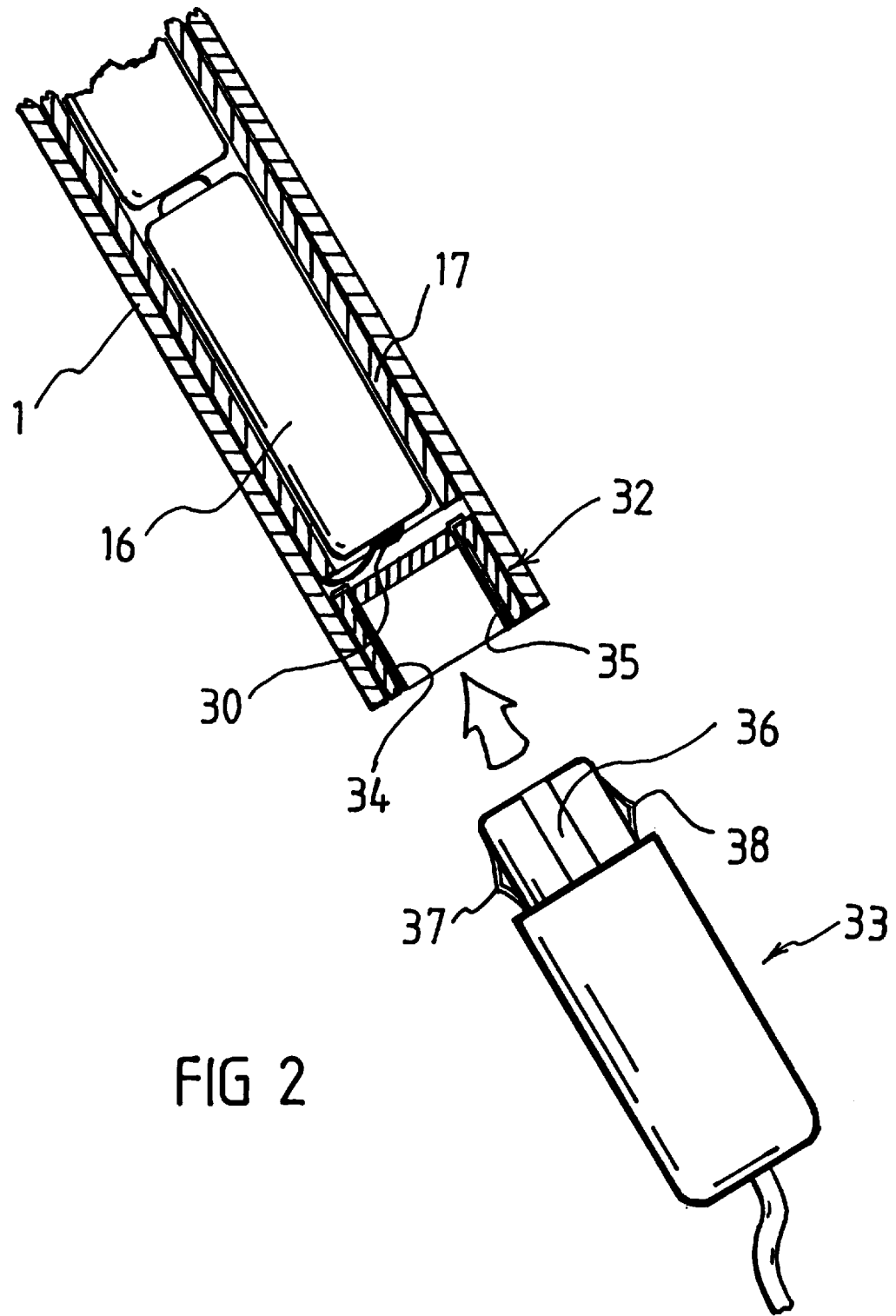
FIG. 2 is a similar section through the lower end of a modified form of the seat post.

FIG. 2 shows a modified form of the seat post in which the cells 16 are in the form of rechargeable nickel-cadmium cells or the like. In place of the spring 20 there is a permanent electrical connection 30, and the end cap 21 is replaced by a female power connector 32. To recharge the cells 16 the seat post is removed from the frame 24 and a d.c. power plug 33 is inserted into the connector 32. The connector 32 includes positive and negative contacts 34 and 35 through which d.c. power can be supplied to recharge the cells, and the plug has a keyway 36 which co-operates with an axial key (not shown) in the connector 32 to ensure the correct orientation of the plug. Spring contacts 37 and 38 carried by the plug 33 make electrical connections with the appropriate contacts 34 and 35.

The incorporation of the lights has no significant affect on the wind resistance of the bicycle so that it is suitable for competitive work.

It will be appreciated that the features disclosed herein may be present in any feasible combination. Whilst the above description lays emphasis on those areas which, in combination, are believed to be new, protection is claimed for any inventive combination of the features disclosed herein.

What I claim is:

1. A seat post comprising:
 a hollow elongate support member having upper and lower ends and a side wall containing a plurality of discrete windows;
 means for mounting a cycle seat at said upper end of said support member;
 a plurality of light-emitting elements mounted within said support member and arranged so that each of said light-emitting elements emits light through one of said windows; and
 said lower end of said support member being adapted to be slidably engaged within a cycle frame.

2. A seat post according to claim 1, in which said windows are spaced longitudinally of said support member.

3. A seat post according to claim 2, in which said windows are aligned longitudinally of said support member.

4. A seat post according to claim 1, in which said support member contains at least one electrical cell for supplying power to said lightemitting element.

5. A seat post according to claim 4, in which the support member includes an electrical switch for controlling the supply of power to said light-emitting element.

6. A seat post comprising:
 a hollow elongate support member having a side wall containing a window;
 means for mounting a cycle seat at an upper end of said support member;
 at least one light-emitting element mounted within said support member and arranged to emit light through said window;
 at least one electrical cell in said support member for supplying power to said light-emitting element; and
 an electrical switch in said support member for controlling the supply of power to said light-emitting element, said electrical switch including an operating member which is accessible through an aperture in said support member without projecting beyond the outer surface of said support member.

7. A seat post according to claim 4, in which said at least one cell is removable through a removable end cap at a lower end of said port member.

8. A seat post according to claim 4, in which said support member comprises connection means through which electrical power can supplied for recharging said at least one cell.

* * * * *